United States Patent [19]

Pollard et al.

[11] 4,047,934

[45] Sept. 13, 1977

[54] BENEFICIATION OF THE NON-FERROUS METAL VALUES OF OXIDE-CONTAINING MATERIALS

[75] Inventors: Leslie John Pollard, Lower Templestowe; Donald Fergusson Stewart, Doncaster, both of Australia

[73] Assignee: ICI Australia Limited, Melbourne, Australia

[21] Appl. No.: 683,242

[22] Filed: May 4, 1976

[30] Foreign Application Priority Data

May 7, 1975 Australia .............................. 1512/75

[51] Int. Cl.[2] .......................... C21B 3/04; C22B 7/00; C22B 9/14
[52] U.S. Cl. .......................................... 75/29; 75/21; 75/24; 75/63; 75/84; 75/89; 75/90 R; 75/113
[58] Field of Search ................. 75/21, 23, 26, 29, 113, 75/9, 63, 89, 90, 84.4, 91, 84, 80, 24; 423/84, 137; 106/65

[56] References Cited

U.S. PATENT DOCUMENTS

| 1,999,209 | 4/1935 | Queneau | 75/113 |
| 3,876,415 | 4/1975 | Bell et al. | 75/113 |
| 3,894,927 | 7/1975 | Kane et al. | 75/113 |

*Primary Examiner*—Walter R. Satterfield
*Attorney, Agent, or Firm*—Cushman, Darby & Cushman

[57] ABSTRACT

A process of removing iron from an oxide-containing material comprising iron oxide in the presence of a non-ferrous metal oxide wherein the oxide-containing material is heated with a solid carbonaceous material in a molten salt bath at a temperature of 750°–1300° C. The molten salt bath comprises at least one chloride selected from the group consisting of alkali metal chlorides and alkaline earth metal chlorides, and optionally contains a hydrogen chloride generator.

10 Claims, No Drawings

BENEFICIATION OF THE NON-FERROUS METAL VALUES OF OXIDE-CONTAINING MATERIALS

This invention relates to the beneficiation of the non-ferrous metal values of oxide containing materials comprising substantial amounts of iron.

The term "oxide containing materials" includes mineral ores and slags or residues formed in metallurgical processes which comprise non-ferrous metal oxides. It is known that the iron content in certain oxide ores containing non-ferrous metals such as for example, manganese, chromium, titanium, vanadium and aluminum and alkali and alkaline earth metals may be selectively reduced to metallic iron leaving the non-ferrous oxides substantially unreduced. It is also known that the addition of small amounts of sodium chloride to the reduction mixture increases the size of the particles of metallic iron formed by this selective reduction.

We have now found that segregation of the metallic iron in oxide ores may be enhanced if the oxide ores are reduced in a bath of molten salt.

Accordingly we provide a process of removing iron from an oxide containing material comprising iron oxide in the presence of a non-ferrous metal oxide wherein the oxide containing material is heated with a solid carbonaceous material in a bath of molten salt to a temperature from 750° to 1200° C. Preferably the reaction is carried out in the presence of hydrogen chloride.

We have found that sufficient hydrogen chloride is dissolved in the salt bath if the partial pressure of hydrogen chloride in the atmosphere above the salt bath is maintained at a partial pressure greater than $10^{-4}$ atmospheres preferably between 0.005 and 0.04 atmospheres. Preferably this atmosphere is maintained by adding hydrogen chloride generators to the salt bath or bubbling hydrogen chloride through the salt bath.

The molten salt comprises at least one alkali metal chloride or alkaline earth metal chloride. The salt must be molten at the desired operating temperature. Whilst such a salt bath may comprise a single alkali metal chloride or alkaline earth metal chloride it lies within our invention that the bath may comprise a mixture of two or more alkali metal chlorides or a mixture of two or more alkaline earth metal chlorides or a mixture of at least one alkali metal chloride with at least one alkaline earth metal salt. A suitable bath may comprise for example sodium chloride alone or alternatively in admixture with one or more other salts such as borax, sodium carbonate, calcium chloride, magnesium chloride, calcium fluoride, calcium sulphate, sodium sulphate, apatite or dolomite. Preferably the bath used in our process is potassium chloride, lithium chloride or sodium chloride either separately or in admixture.

Our process is of use in the removal of iron from iron oxide containing ores for example low grade manganese ore, vanadium, niobium and tantalum containing slags and concentrates, and concentrates of chromite ores.

A preferred use for the process of our invention is the beneficiation of ilmenite and other titaniferous ores to a high grade titanium oxide concentrate which can be used as a substitute for rutile.

A second preferred use of the process of our invention is in the removal of iron from bauxite to give an iron free product suitable for chlorination to aluminum trichloride and subsequent electrolysis to give metallic aluminum.

We have found that sometimes beneficial results may be obtained when hydrogen chloride generator is added to the feed in such amounts as will theoretically produce a small partial pressure of hydrogen chloride within the reaction mixture.

Preferably the hydrogen chloride generator should not release hydrogen chloride during heating to reaction temperature and should not introduce impurities into the system. The nature of the hydrogen chloride generator is not narrowly critical. Typical hydrogen chloride generators are for example ferrous chloride and chlorinated hydrocarbons e.g. vinyl chloride wastes and scrap polyvinyl chloride.

Using ilmenite and bauxite and adding $FeCl_2.4H_2O$ as the hydrogen chloride generator we have obtained beneficial results using a weight ratio of ferrous chloride hydrate to oxide containing material in the range from 0.005:1 to 0.1:1.

The optimum amounts required for any particular ore and hydrogen chloride generator can be determined by simple experiment.

Preferably sufficient solid carbonaceous reductant should be added to just achieve metallisation of the iron present in the ore. We have found that this requires a small excess over the theoretical requirement however we have also found that an increase in reductant above that required for metallisation can lead under certain circumstances to inefficient segregation.

Thus for a typical ilmenite ore containing about 30% weight percent iron we prefer to maintain the weight ratio of solid carbonaceous material expressed as carbon to ore between 0.1:1 and 0.3:1 most preferably between 0.12:1 and 0.25:1.

For bauxite ores we prefer that the weight ratio of carbon to bauxite is between 0.01:1 and 0.3:1.

To achieve the desired segregation of iron we prefer to maintain the reaction temperature in the range from 750° to 1300° C. To some extent the reaction temperature depends upon the nature of the ore. Thus we have found for bauxite the preferred temperature range is 750° to 1100° C while for ilmenite the preferred temperature range is 900° to 1300° C. Although grinding is not necessary it is an advantage for ilmenite especially at low temperatures to grind the ore as fine as possible. Thus for ilmenite reduction at 900° C the reaction will only proceed at a satisfactory rate if the ore is ground to pass a 50 micron mesh. For bauxite material passing a 1 mm mesh has been found satisfactory. Using coarser material the reaction will proceed but at a much slower rate.

The reaction time is not narrowly critical with ilmenite improved results are obtained if the mixture is heated for four hours or longer. Using bauxite we have found that the reaction times of over four hours do not increase the efficiency of the segregation and that shorter reaction times of about 20 minutes give good segregation. The optimum temperatures and reaction times for any given ore may be found by simple experimentation.

The reduced ore recovered from the bath may be separated into metallic iron and other unreduced components of the ore such as e.g. titanium oxide or bauxite by any suitable physical means such as gravity separation or various methods of ellutriation known to those skilled in the art. However we prefer to use magnetic separation.

The treated bauxite after removal of the metallic iron fraction is in a suitable form for chlorination to aluminum trichloride for direct electrolysis to give aluminum metal.

The feed to the process of our invention may be prepared in any convenient form such as mixed fine powder or composite carbon-ore pellets.

If lump ore is used we prefer to grind the feed to at least pass an approximately 1 mm screen prior to feeding to the salt bath.

The invention is illustrated by, but by no means limited to, the following examples.

EXAMPLE I

The following example illustrates the application of the invention to an ilmenite ore.

10 grams of a Western Australian beach sand ilmenite containing approximately 31% iron and 56% titanium dioxide was mixed with two grams of a metallurgical coke ground in a hammer mill and screened to remove the −200 mesh (76 micron) fraction.

The mixture was charged to a furnace with 10 gram of sodium chloride sufficient to ensure that salt bath conditions would exist above the melting point of sodium chloride. An atmosphere comprising 65% nitrogen, 32% carbon monoxide and 3% hydrogen chloride was maintained above the salt bath and the mixture allowed to react for 2 hours at 1130° C.

After reaction the mixture was cooled, removed from the furnace, washed to remove the sodium chloride and the residue separated magnetically using a hand magnet.

Three fractions were obtained. A highly magnetic fraction containing mainly metallic iron - carbon composites, a non-magnetic fraction essentially pure titanium oxides and two intermediate fractions comprising mainly titanium oxides but with residual iron.

After assaying the following results were obtained:

| Fraction | Assay | | Yield of Fraction | |
|---|---|---|---|---|
| | % TiO$_2$ | % Fe | % Ti | % Fe |
| Magnetic | 5.5 | 73.8 | 3.4 | 87.1 |
| Intermediate A | 19.5 | 20.2 | 4.6 | 9.1 |
| Intermediate B | 39.1 | 6.8 | 6.6 | 2.2 |
| Non-magnetic | 93.2 | 0.9 | 85.4 | 1.6 |

EXAMPLE 3

The following example illustrates the use of ferrous chloride or a hydrogen chloride generator.

10 g of the same ilmenite as used in Example 1 was ground and screened to pass a 300 mesh (50 microns) and mixed with a metallurgical coke (2 g) screened at approximately −150 microns +75 microns.

10 gram of sodium chloride and 0.3 gram of ferrous chloride, as FeCl$_1$.4H$_2$O, was added to the mixture prior to charging to a furnace. The level of sodium chloride was sufficient to give salt bath conditions on melting.

An atmosphere comprising 66% nitrogen and 33% carbon monoxide was maintained above the salt bath.

The mixture was reacted for 3 hours at 1000° C. After cooling the products were separated as in Example 1.

The following yields and assays were obtained for the various fractions.

| Fraction | Assay | | Yield in Fraction | |
|---|---|---|---|---|
| | % TiO$_2$ | % Fe | % Ti | % Fe |
| Magnetic | 15.4 | 63.3 | 15.5 | 96.8 |
| Intermediate | 64.0 | 11.5 | 7.1 | 1.8 |
| Non-magnetic | 94.9 | 1.1 | 77.4 | 1.4 |

EXAMPLE 3

The following example illustrates the use of the process for removing iron from bauxite.

A bauxite from Weipa Queensland containing approximately 7% iron was screening at 100 mesh (153 microns).

10 gram of the undersize was mixed with char in the weight ratio 1 part ore to 0.08 parts char. 10 gram of sodium chloride was added to the mixture to generate salt bath conditions.

The mixture was charged to a furnace with the atmosphere maintained at a level of 63% nitrogen, 34% carbon monoxide and 3% hydrogen chloride and reacted for 90 minutes at 1000° C.

After reaction the mixture was cooled, washed to remove excess salt and the iron removed magnetically. The residue was a white powder containing 95% of the initial alumina values with no detectable iron.

EXAMPLE 4

10 g samples of screened bauxite were mixed with 1.6 gram of South Bulli coke. 10 grams of flux was added to each sample mixture to generate salt bath conditions. The mixtures were either treated with 0.6 gram ferrous chloride and heated in a furnace with the atmosphere maintained at a level of 65% nitrogen, 35% carbon monoxide or were heated in a furnace with an atmosphere maintained at a level of 63% nitrogen, 34% carbon monoxide and 3% hydrogen chloride in the absence of ferrous chloride.

After reaction each sample was cooled, washed to remove excess salt and the iron removed magnetically. The residue was analysed for iron. The results are shown in Table 1. The analysis of the bauxite types used are shown below.

| | % S$_1$O$_2$ | % Al$_2$O$_3$ | % Fe$_2$O$_3$ | % TiO$_2$ |
|---|---|---|---|---|
| Darling Ranges (W.A.) | 10.7 | 43.8 | 17.5 | 1.14 |
| Weipa bauxite (QAL 2) | 3.5 | 52.6 | 13.8 | 2.7 |
| Weipa bauxite (QAL 1) | 5.1 | 55.9 | 6.5 | 2.3 |

TABLE 1

| Furnace Conditions | | Hydrogen Chloride Source | Carbon Size BSS # | Bauxite | | Flux | % Iron in Product |
|---|---|---|---|---|---|---|---|
| T° C | Time (hours) | | | Type | Size BSS # | | |
| 1000 | 2 | HCl | −52 + 100 | QAL 1 | −72 + 200 | NaCl | 1.4 |
| 950–1000 | 2 | HCl | −36 + 52 | QAL 2 | −10 + 52 | NaCl | 1.2 |
| 1000 | 2 | FeCl$_3$ | −100 + 200 | WA | −100 + 200 | NaCl | 2.0 |
| 1000 | 2 | FeCl$_3$ | −100 + 200 | QAL 2 | −100 + 200 | NaCl | 1.5 |
| 1060 | 1.5 | FeCl$_3$ | −52 + 100 | WA | −36 + 100 | NaCl | 2.0 |
| 1000 | 2 | HCl | −52 + 100 | QAL 2 | −36 + 72 | KCl:LiCl:NaCl 1:0.5:1 | 1.6 |
| 1000 | 0.3 | HCl | −52 + 100 | QAL 2 | −36 + 72 | NaCl | 1.5 |
| 1000 | 2 | 0 | −52 + 100 | QAL 2 | −36 + 72 | NaCl | 10.2 |

We claim:

1. In a process of removing iron from an oxide containing material comprising iron oxide in the presence of a non-ferrous metal oxide wherein the iron oxide in the oxide containing material is selectively reduced to iron while leaving non-ferrous metal oxide substantially unreduced, the improvement whereby segregation of the iron thus obtained is enhanced, said improvement comprising heating said oxide-containing material with a solid carbonaceous material in a bath of molten salt to a temperature in the range from 750° to 1300° C, wherein said salt comprises at least one chloride selected from the group consisting of alkali metal chlorides and alkaline earth metal chlorides.

2. A process according to claim 1 wherein the process is carried out in the presence of hydrogen chloride at a partial pressure in the atmosphere above the salt bath greater than $10^{-4}$ atmospheres.

3. A process according to claim 2 wherein the atmosphere above the salt bath contains a partial pressure of hydrogen chloride in the range from 0.005 to 0.04 atmospheres.

4. A process according to claim 1 wherein the molten salt is selected from the group consisting of potassium chloride, lithium chloride and sodium chloride.

5. A process according to claim 1 wherein the oxide containing material is chosen from the group consisting of low grade manganese ores, vanadium, niobium and tantalum containing slags and concentrates of chromium ores.

6. A process according to claim 1 wherein the oxide containing material is ilmenite.

7. A process according to claim 1 wherein the oxide containing material is bauxite.

8. A process according to claim 7 wherein the oxide containing material is bauxite and the reaction mixture is heated to a temperature in the range from 750° to 1100° C.

9. A process according to claim 1 wherein a weight ratio of ferrous chloride hydrate added to the oxide containing material is in the range from 0.005:1 to 0.1:1.

10. A process according to claim 8 wherein the weight ratio of solid carbonaceous material to bauxite is in the range from 0.01:1 to 0.3:1.

* * * * *